(12) United States Patent
Nakazawa et al.

(10) Patent No.: US 10,953,770 B2
(45) Date of Patent: Mar. 23, 2021

(54) VEHICLE SEAT

(71) Applicant: TS TECH CO., LTD., Saitama (JP)

(72) Inventors: Takatoshi Nakazawa, Tochigi (JP); Wataru Honda, Tochigi (JP); Hiromi Taniguchi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/498,037

(22) PCT Filed: Mar. 23, 2018

(86) PCT No.: PCT/JP2018/011654
§ 371 (c)(1),
(2) Date: Sep. 26, 2019

(87) PCT Pub. No.: WO2018/186206
PCT Pub. Date: Oct. 11, 2018

(65) Prior Publication Data
US 2020/0023754 A1    Jan. 23, 2020

(30) Foreign Application Priority Data
Apr. 3, 2017  (JP) .............................. 2017-073464

(51) Int. Cl.
*B60N 2/68* (2006.01)
*B60N 2/16* (2006.01)
*B60N 2/02* (2006.01)

(52) U.S. Cl.
CPC ........... *B60N 2/161* (2013.01); *B60N 2/0232* (2013.01)

(58) Field of Classification Search
CPC ........ B60N 2/161; B60N 2/68; B60N 2/1615; B60N 2/7094; B60N 2/682; B60N 2/0232
See application file for complete search history.

(56) References Cited

U.S. PATENT DOCUMENTS 4,993,678 A * 2/1991 Easter .................. B60N 2/1615
                                                         248/371
5,882,061 A * 3/1999 Guillouet ............. B60N 2/1615
                                                         248/421

(Continued)

FOREIGN PATENT DOCUMENTS

JP     2007230253    9/2007
JP     2015003577    1/2015

(Continued)

OTHER PUBLICATIONS

International Search Report for PCT/JP2018/011654 dated May 30, 2018, 2 pages.

*Primary Examiner* — Shin H Kim
(74) *Attorney, Agent, or Firm* — Dority & Manning, P.A.

(57) ABSTRACT

A vehicle seat (1) is provided with a cushion frame (5) that can be moved up and down by means of a link mechanism (6). To assist the upward movement of the cushion frame (5), a torsion bar (14) is disposed in a connection pipe (12) having both ends secured to a pair of left and right rear links (11, 11). A position holding member (24) holds the torsion bar (14) and is supported by the connection pipe (12), whereby the positional shift of the axis of the torsion bar (14) is suppressed. The position holding member (24) engages an extension portion (16) extending perpendicular to the shaft portion (15), and thus, does not rotate around the axis relative to the torsion bar (14). Therefore, in the position holding member (24), portions requiring reinforcement against a transverse force from the torsion bar (14) are limited a narrow range, and the position holding member (24) can be reduced in size and weight.

11 Claims, 9 Drawing Sheets

(56) References Cited

U.S. PATENT DOCUMENTS

| | | | | |
|---|---|---|---|---|
| 6,264,274 B1* | 7/2001 | Frohnhaus | ............ | B60N 2/1615 297/313 |
| 6,517,157 B1* | 2/2003 | Vorac | ................... | B60N 2/0232 297/344.13 |
| 6,957,796 B2* | 10/2005 | Hensley | ................... | B60N 2/06 248/421 |
| 7,861,994 B2* | 1/2011 | Yamada | ................ | B60N 2/165 248/421 |
| 7,963,605 B2* | 6/2011 | Ramaseshadri | ........ | B60N 2/002 297/344.15 |
| 8,322,675 B2* | 12/2012 | Ducreuzot | ............ | B60N 2/682 248/424 |
| 8,408,510 B2* | 4/2013 | Jeong | ................... | B60N 2/1615 248/421 |
| 9,533,610 B2* | 1/2017 | Eckhoff | ................. | B60N 2/682 |
| 2008/0007104 A1* | 1/2008 | Yokota | ................ | B60N 2/1615 297/344.15 |
| 2010/0013285 A1* | 1/2010 | Stanz | ................... | B60N 2/0232 297/344.13 |
| 2012/0139306 A1* | 6/2012 | Jeong | ................... | B60N 2/167 297/216.1 |
| 2012/0256465 A1* | 10/2012 | Lilla | ...................... | B60N 2/161 297/452.2 |
| 2013/0161989 A1* | 6/2013 | Ito | ........................ | B60N 2/1615 297/313 |
| 2013/0187418 A1* | 7/2013 | Watanabe | ............. | B60N 2/888 297/216.14 |
| 2014/0232163 A1* | 8/2014 | Eckhoff | ................ | B60N 2/161 297/452.19 |
| 2014/0346830 A1* | 11/2014 | Tanaka | ............... | B60N 2/42763 297/344.15 |
| 2015/0097404 A1* | 4/2015 | Furuta | .................. | B60N 2/1615 297/344.15 |
| 2015/0151653 A1* | 6/2015 | Furuta | .................... | B60N 2/686 297/344.15 |
| 2017/0232871 A1* | 8/2017 | Asai | ........................ | B60N 2/16 297/344.15 |
| 2020/0023754 A1* | 1/2020 | Nakazawa | ........... | B60N 2/1675 |

FOREIGN PATENT DOCUMENTS

| | | |
|---|---|---|
| WO | WO2012038080 | 3/2012 |
| WO | WO2017022675 | 2/2017 |

\* cited by examiner

VEHICLE SEAT

CROSS REFERENCE TO RELATED APPLICATIONS

This application is the U.S. National Stage entry of International Application Number PCT/JP2018/011654 filed under the Patent Cooperation Treaty having a filing date of Mar. 23, 2018, which claims priority to Japanese Patent Application No. 2017-073464 having a filing date of Apr. 3, 2017, which are incorporated herein by reference.

TECHNICAL FIELD

The present disclosure relates to a vehicle seat provided with a height-adjustable seat cushion.

BACKGROUND ART

A vehicle seat provided with a height-adjustable seat cushion is known. For instance, Patent Document 1 discloses a seat cushion that can be moved up and down by means of links, in which a torsion bar is placed in a pipe connecting a pair of left and right links such that the upward movement of the seat cushion is assisted by the biasing force of the torsion bar. On one end of the torsion bar and the pipe, a position holding member for holding the torsion bar is fitted into the inner hole of the pipe to align the axis of the torsion bar with the central axis of the pipe. Also, Patent Document 2 discloses a cylindrical position holding member consisting of two semi-cylindrical parts.

PRIOR ART DOCUMENT(S)

Patent Document(s)

Patent Document 1: JP2007-230253A
Patent Document 2: JP2015-3577A

SUMMARY OF THE INVENTION

Task to be Accomplished by the Invention

However, the prior art position holding member may rotate relative to the torsion bar such that the position of the position holding member which receives a transverse force from the torsion bar may change. Therefore, it was necessary to secure the strength of the position holding member over a wide angular range, which hindered the reduction in size and weight of the position holding member.

In addition, when the end portion of the torsion bar is bent, assembly is difficult with the position holding member described in Patent Document 1. With the position holding member described in Patent Document 2 which consists of two parts, assembly is possible but the number of component parts becomes large and the assembling work is complicated.

In view of such prior art problems, a primary object of the present invention is to provide a vehicle seat provided with a height-adjustable seat cushion including a position holding member that does not rotate relative to the torsion bar. Also, at least some of the embodiments of the present invention are aimed to provide a position holding member that can be assembled easily.

Means to Accomplish the Task

A vehicle seat (1) in at least some of the embodiments of the present invention is a vehicle seat provided with a height-adjustable seat cushion, comprising: a base member (2) supported by a vehicle body; a cushion frame (5) constituting a frame of the seat cushion (3); a link mechanism (6) that supports the cushion frame to be movable up and down relative to the base member; a drive mechanism (7) that drives the cushion frame in a vertical direction via the link mechanism; and a torsion bar (14) that, to urge the cushion frame upward, extends between left and right side portions of the cushion frame and has lateral first and second ends (17, 16b) respectively joined to a first portion (12) and a second portion (8) that rotate relative to each other in a pivot portion of the link mechanism, wherein the torsion bar includes a shaft portion (15) extending in a lateral direction and an extension portion (16) at least partially extending in a direction intersecting the shaft portion and joined to the second portion on a side of the second end, the first portion unrotatably supports the first end of the torsion bar and supports a part of the shaft portion of the torsion bar adjacent to the second end via a position holding member (24, 41) for suppressing displacement of the axis of the torsion bar, and the position holding member includes a main body (25, 42) supported to be rotatable relative to the first portion and provided with a through-hole (27) for insertion of the shaft portion and an engagement portion (26, 43) engaging with the extension portion so as to rotate integrally.

According to this configuration, because the position holding member does not rotate relative to the torsion bar around the axis but rotates relative to the first portion, the position on the position holding member where the transverse force of the torsion bar is applied is fixed, and therefore, it is sufficient that the position holding member has a strength withstanding the transverse force in a narrow angular range.

A vehicle seat according to at least some of the embodiments of the present invention is characterized in that, in the foregoing configuration, one of the cushion frame and the link mechanism includes a connection pipe (12) that is rotatable relative to the other, the connection pipe constitutes the first portion, and the main body of the position holding member has a cylindrical contour and is rotatably received in an inner hole (13) of the connection pipe.

According to this configuration, the first portion can be achieved with a simple structure.

A vehicle seat according to at least some of the embodiments of the present invention is characterized in that, in any of the foregoing configurations, the engagement portion (26) of the position holding member (24) includes an engagement protrusion (30) that protrudes from the main body (25) and an engagement claw (29) that protrudes from the main body and resiliently holds the extension portion in cooperation with the engagement protrusion or the engagement portion (43) of the position holding member (41) includes a pair of engagement claws (44) that protrude from the main body (42) and resiliently sandwich the extension portion.

According to this configuration, the engagement portion can be achieved with a simple structure.

A vehicle seat according to at least some of the embodiments of the present invention is characterized in that, in the foregoing configuration, the engagement claw retains the extension portion by overhanging the same and is positioned above the engagement protrusion.

According to this configuration, the engagement state of the engagement portion can be checked easily.

A vehicle seat according to at least some of the embodiments of the present invention is characterized in that, in any of the foregoing configurations, the engagement portion is positioned more laterally outward than the second portion.

According to this configuration, the engagement state of the engagement portion can be checked easily.

A vehicle seat according to at least some of the embodiments of the present invention is characterized in that, in any of the foregoing configurations, the position holding member is provided, on a laterally inner end surface thereof, with a receiving groove (35) recessed to extend in a radial direction so as to be capable of receiving the extension portion, and consists of an integrally molded article.

According to this configuration, when the torsion bar is inserted into the through-hole of the position holding member and the position of the position holding member relative to the torsion bar is shifted, the bent extension portion of the torsion bar is received in the receiving groove so that the shifting of the position of the position holding member is allowed. Thus, by inserting the end portion of the torsion bar into the through-hole of the position holding member consisting of an integrally molded article and shifting the position holding member, they can be assembled together.

A vehicle seat according to at least some of the embodiments of the present invention is characterized in that, in the foregoing configuration, the receiving groove is provided at a position circumferentially shifted from a side where a transverse force that the position holding member receives from the torsion bar becomes maximum.

According to this configuration, because the receiving groove is not provided at the position where the transverse force of the torsion bar is applied, it is possible to secure the strength of the position holding member.

A vehicle seat according to at least some of the embodiments of the present invention is characterized in that, in the foregoing configuration, the side where the transverse force that the position holding member receives from the torsion bar becomes maximum is reinforced preferentially.

According to this configuration, since the part that receives the transverse force and requires a strength is reinforced preferentially, another part that may have a low strength is given less reinforcement and the position holding member can be reduced in size and weight.

A vehicle seat according to at least some of the embodiments of the present invention is characterized in that, in any of the foregoing configurations, multiple ribs (34) extending along an axial direction are provided on an outer circumferential surface of the main body of the position holding member.

According to this configuration, because the ribs slidably contact the connection pipe that serves as the first portion, the frictional resistance when the position holding member slides relative to the connection pipe can be reduced.

A vehicle seat according to at least some of the embodiments of the present invention is characterized in that, in the foregoing configuration, a side circumferential wall of the main body includes an inner circumferential wall (31) defining the through-hole, an outer circumferential wall (32) rotatably supported by the first portion, and multiple reinforcement walls (33) extending in a radial direction and connecting between the inner circumferential wall and the outer circumferential wall, and at least some of the reinforcement walls are provided at positions aligned with the ribs in the radial direction.

According to this configuration, because the position holding member has a hollowed structure, the weight of the position holding member can be reduced, and because the ribs and the reinforcement walls are mutually aligned in the radial direction, the reinforcement against the transverse force of the torsion bar can be achieved efficiently.

Effect of the Invention

According to the present invention, because the position holding member does not rotate relative to the torsion bar but rotates relative to the first portion, the position on the position holding member where the transverse force of the torsion bar is applied is fixed, and therefore, it is only required that the holding member has a strength that withstands the transverse force in a narrow angular range.

In the configuration in which the first portion is constituted of a connection pipe, the structure can be simplified.

In the configuration in which the engagement portion includes an engagement claw, the structure can be simplified.

In the configuration in which the engagement claw overhangs the extension portion, the engagement state of the engagement portion can be checked easily.

In the configuration in which the engagement portion is positioned more laterally outward than the second portion, the engagement state of the engagement portion can be checked easily.

In the configuration in which the position holding member is provided with a receiving groove, by inserting the end portion of the torsion bar into the through-hole of the position holding member and shifting the position holding member, they can be assembled together.

In the configuration in which the receiving groove is provided at a position circumferentially shifted from a side where a transverse force received from the torsion bar becomes maximum, the receiving groove is not provided at the position where the transverse force of the torsion bar is applied, and therefore, it is possible to secure the strength of the position holding member.

In the configuration in which the side where the transverse force that the position holding member receives from the torsion bar becomes maximum is reinforced preferentially, the part that receives the transverse force and requires a strength is reinforced preferentially, and therefore, it is possible to give less reinforcement to another part that may have a low strength and to reduce the size and weight of the position holding member.

In the configuration in which multiple ribs extending along an axial direction are provided on an outer circumferential surface of main body of the position holding member, the ribs slidably contact the connection pipe that serves as the first portion, and therefore, the frictional resistance when the position holding member slides relative to the connection pipe can be reduced.

In the configuration in which the position holding member includes an inner circumferential wall, an outer circumferential wall, reinforcement walls, and at least some of the reinforcement walls are provided at positions aligned with the ribs in the radial direction, the position holding member has a hollowed structure, and therefore, the weight of the position holding member can be reduced, and also, because the ribs and the reinforcement walls are mutually aligned in the radial direction, the reinforcement against the transverse force of the torsion bar can be achieved efficiently.

MODES FOR CARRYING OUT THE INVENTION

Figure 1:
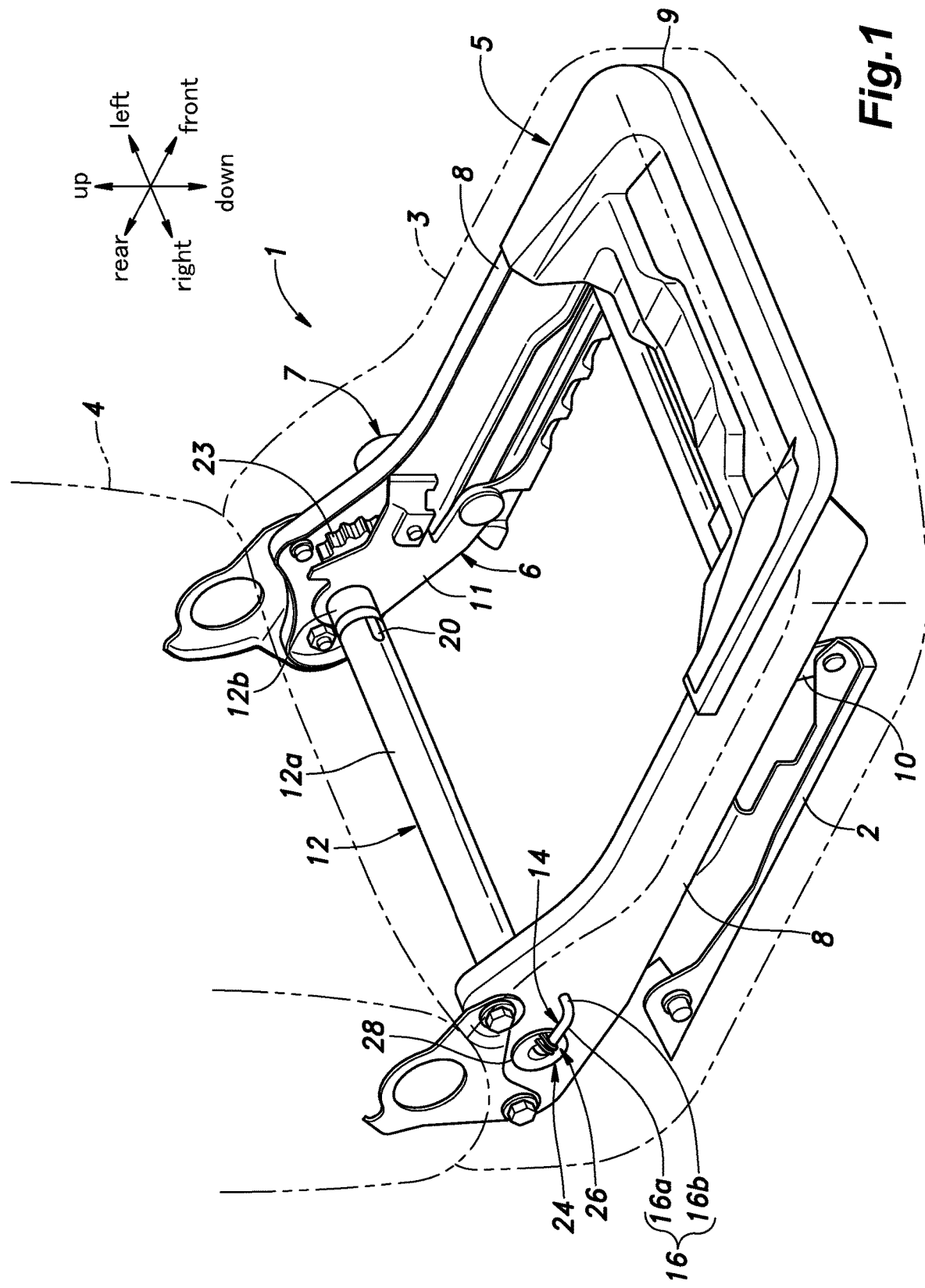
FIG. 1 is a perspective view showing a vehicle seat according to the first embodiment.

In the following, a vehicle seat according to the first embodiment of the present invention will be described with reference to the drawings. As shown in FIG. 1, the vehicle seat 1 is to be installed as a driver's seat or a passenger seat of a vehicle and includes a pair of left and right base members 2, 2 supported by a vehicle body, a seat cushion 3 supported by the pair of left and right base members 2, 2, a seat back 4 connected to the seat cushion 3, and a headrest (not shown in the drawings) connected to the seat back 4. The position of the seat cushion 3 is adjustable in a height direction owing to a link mechanism 6 that supports a cushion frame 5, which constitutes a frame of the seat cushion 3, to be movable up and down relative to the base members 2 and a drive mechanism 7 that drives the cushion frame 5 in the vertical direction via the link mechanism 6. Further, the vehicle seat 1 is preferably supported on the vehicle body via rails (not shown in the drawings) extending in the fore-and-aft direction so that the position thereof is adjustable in the fore-and-aft direction.

The cushion frame 5 includes a pair of left and right side frames 8, 8 and a front frame 9 connecting between the pair of left and right side frames 8, 8 on a front side.

The link mechanism 6 includes a pair of left and right front links 10, 10 respectively connecting between the pair of left and right base members 2, 2 and the pair of left and right side frames 8, 8 on a front side and a pair of left and right rear links 11, 11 respectively connecting between the pair of left and right base members 2, 2 and the pair of left and right side frames 8, 8 on a rear side, and each link 10, 10, 11, 11 is pivoted to the corresponding base member 2 and the corresponding side frame 8 about laterally extending axes. In the pair of left and right rear links 11, 11, the rotation axes of the left pivot portions and the corresponding right pivot portions are coaxial.

Figure 2:
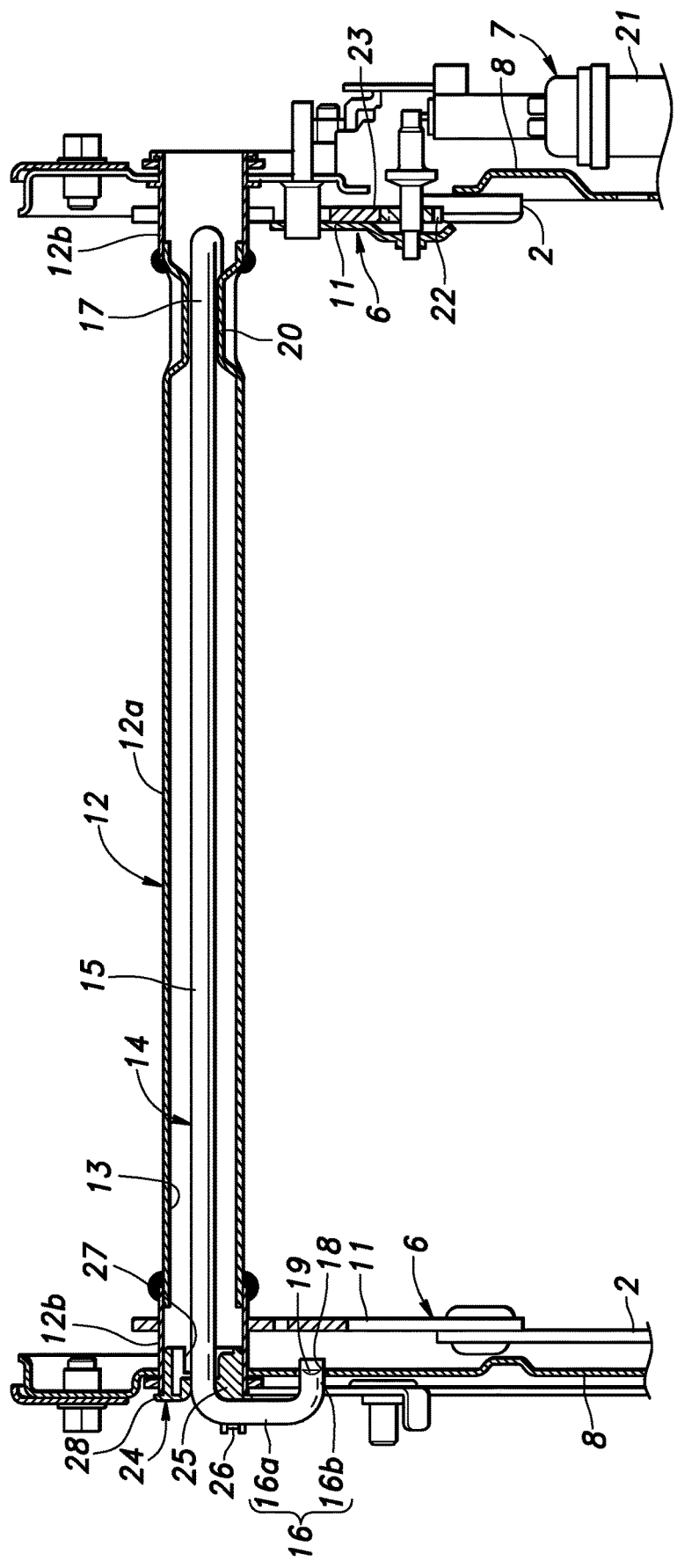
FIG. 2 is a horizontal sectional view showing a vicinity of a torsion bar of the vehicle seat according to the first embodiment.

The link mechanism 6 further includes a connection pipe 12 extending laterally and having left and right end portions secured to the respective rear links 11. As shown in FIGS. 1 and 2, the connection pipe 12 has a central axis coaxial with the rotation axes of the pair of left and right side frames 8, 8 and the pair of left and right rear links 11, and the end portions 12b of the connection pipe 12 secured to the rear links 11 are rotatably pivoted to the side frames 8, whereby the pair of left and right rear links 11, 11 and the connection pipe 12 together can rotate relative to the pair of left and right side frames 8, 8 about an axis extending in the lateral direction. The left and right end portions 12b, 12b of the connection pipe 12 constituting the pivot portions are members separate from the main body 12a and respectively joined by welding to the left and right ends of the main body 12a after processing so that the shape of the end portions 12b, 12b is not changed by the processing of the main body 12a.

Figure 3:
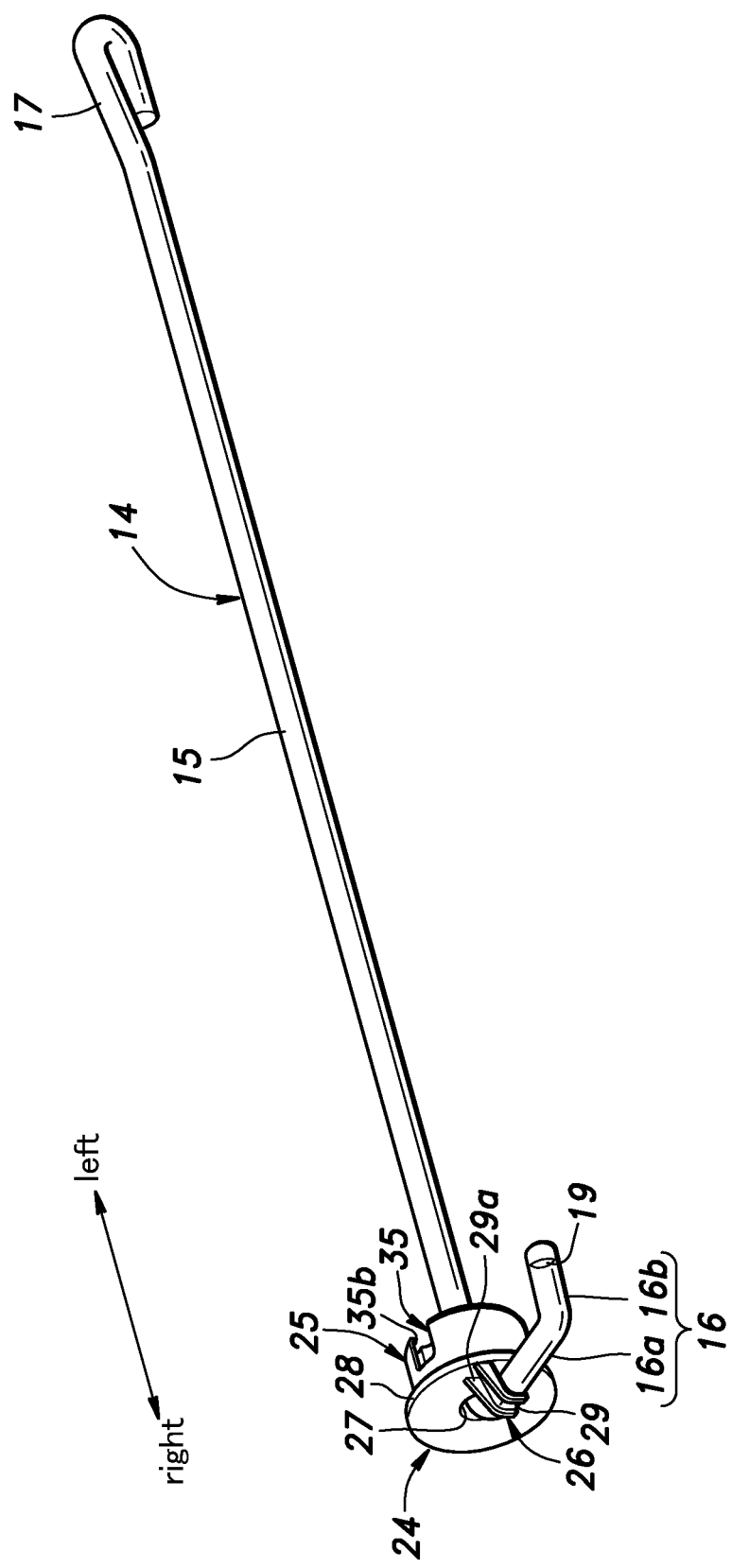
FIG. 3 is a perspective view showing the torsion bar and a position holding member according to the first embodiment.
Figure 4:
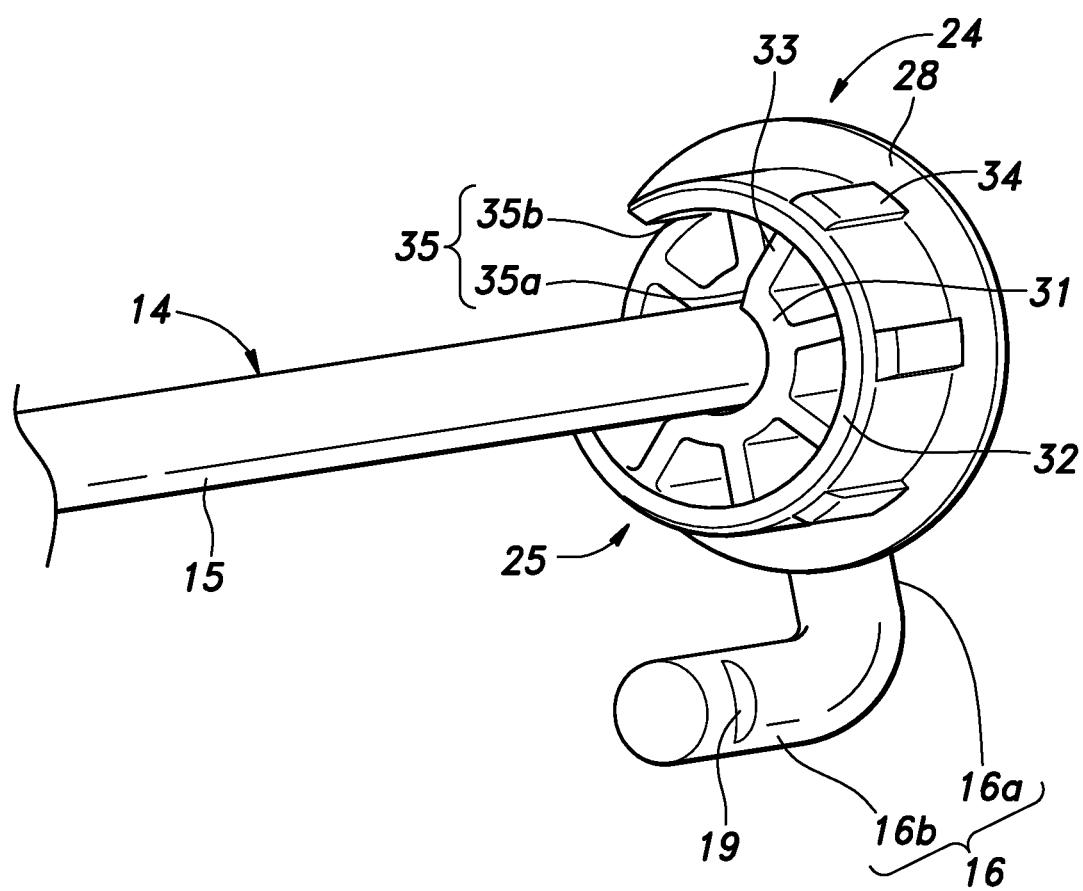
FIG. 4 is a perspective view showing an assembled state of the position holding member according to the first embodiment to the torsion bar.

A torsion bar 14 inserted in an inner hole 13 of the connection pipe 12 is formed by bending both end portions of a steel rod having a circular cross-section. As shown in FIG. 3, the torsion bar 14 includes a shaft portion 15 that extends laterally, an extension portion 16 having a first extension portion 16a extending from the right end of the shaft portion 15 orthogonally to the shaft portion 15 and a second extension portion 16b extending leftward from a tip end of the first extension portion 16a in parallel with the shaft portion 15, and a fold-back portion 17 formed by folding back the left end portion of the steel rod so that the rotation about the axis can be easily restricted.

As shown in FIG. 2, the extension portion 16 is positioned outside of the inner hole 13 of the connection pipe 12. The second extension portion 16b is positioned forward of the shaft portion 15 and is engaged with an engagement hole 18 provided in the right side frame 8. To prevent the second extension portion 16b from getting out of the engagement hole 18 rightward, an upper surface of the second extension portion 16b is provided with an engagement groove 19 for engaging with a part of the side frame 8 defining the engagement hole 18. Since the extension portion 16 is engaged with the right side frame 8, the right end side of the torsion bar 14 is restricted from rotating relative to the right side frame 8 about the axis.

A left end side of the main body 12a of the connection pipe 12 is provided with a flattened pipe portion 20 formed by denting the main body 12a from front and back to narrow the inner hole 13. The fold-back portion 17 of the torsion bar 14 is sandwiched at the flattened pipe portion 20 in the inner hole 13, whereby the left end side of the torsion bar 14 is restricted from rotating relative to the connection pipe 12 about the axis.

The torsion bar 14 is retained by the right side frame 8 and the flattened pipe portion 20 in a twisted state. When the cushion frame 5 is moved up and down, the angle between the right side frame 8 and the pair of left and right rear links 11, 11 as well as the connection pipe 12 changes, and therefore, the twist angle of the torsion bar 14, which is engaged with the right side frame 8 on the right end side thereof and with the connection pipe 12 on the left end side thereof changes. The torsion bar 14 is installed such that when the cushion frame 5 is moved down, the twist angle of the torsion bar 14 increases, and when the cushion frame 5 is moved up, the twist angle of the torsion bar 14 decreases, and therefore, the biasing force produced by the twisting of the torsion bar 14 acts in the direction to move the cushion frame 5 upward.

The drive mechanism 7 includes an electric motor 21 secured to the left side frame 8, a pinion 22 that is rotated by the rotation of the electric motor 21, and a gear 23 secured to the left rear link 11 and meshing with the pinion 22. The electric motor 21 drives the cushion frame 5 in the vertical direction via the pinion 22, the gear 23, and the left rear link 11. At this time, the right rear link 11 operates in linkage with the left rear link 11 via the connection pipe 12, and the pair of left and right front links 10, 10 operate in linkage with the pair of left and right rear links as the pair of left and right side frames 8, 8 and the front frame 9 are rigidly connected with each other. Instead of the electric motor 21, a configuration may be made such that the cushion frame 5 is driven manually.

As shown in FIGS. 1 and 2, a position holding member 24 is mounted between the right end side of the connection pipe 12 and the right end side of the shaft portion 15 of the torsion bar 14 to align the axis of the torsion bar 14 with the central axis of the connection pipe 12 and to maintain that state.

As shown in FIGS. 3 to 6, the position holding member 24 is an integrally molded article including a main body 25 configured to hold the shaft portion 15 of the torsion bar 14 and to be attached to the connection pipe 12 and an engagement portion 26 configured to engage with the first extension portion 16a of the torsion bar 14.

The main body 25 has a cylindrical contour formed with a through-hole 27 extending along the lateral direction. The shaft portion 15 of the torsion bar 14 is inserted into and held by the through-hole 27 and the cylindrical outer circumferential surface of the main body 25 contacts the inner circumferential surface of the inner hole 13 of the connection pipe 12, whereby the position of the axis of the shaft portion 15 of the torsion bar 14 is maintained. If the position of the axis of the shaft portion 15 shifts relative to the connection pipe 12, the biasing force of the torsion bar 14 deviates from the designed value, but the position holding member 24 can prevent this shifting. The right end of the main body 25 is provided with a flange 28 that extends from the side circumferential surface in the radial direction, and the left surface of the flange 28 abuts against the right end of the connection pipe 12 to determine the lateral position of the position holding member 24 relative to the connection pipe 12 (see FIG. 2).

Figure 5:
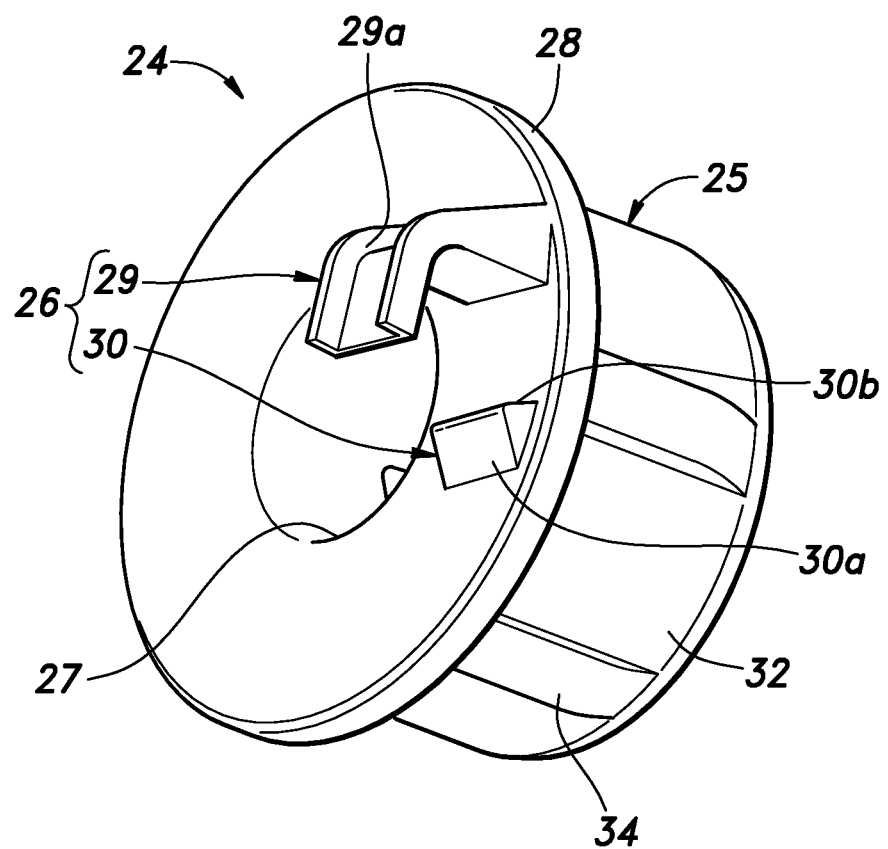
FIG. 5 is a perspective view showing the position holding member according to the first embodiment.

As shown in FIG. 5, the engagement portion 26 includes an engagement claw 29 and an engagement protrusion 30 that are provided on the right end surface of the main body 25 and oppose each other. The free end side of the engagement claw 29 is bent toward the engagement protrusion 30 so as to overhang the first extension portion 16a (see FIG. 3) and the distance between the right end surface of the main body 25 and the surface of the free end side of the engagement claw 29 facing is substantially the same as the diameter of the first extension portion 16a of the torsion bar 14. The surface of the engagement claw 29 opposite to the surface facing the first extension portion 16a is provided with ribs 29a extending along the respective side edges thereof for reinforcing the strength. The top of the engagement protrusion 30 does not protrude from the main body 25 more than the free end of the engagement claw 29, and the distance between the top of the engagement protrusion 30 and the free end of the engagement claw 29 is usually smaller than the diameter of the first extension portion 16a but, with resilient deformation of the engagement claw 29, the first extension portion 16a can pass between the top of the engagement protrusion 30 and the free end of the engagement claw 29. A configuration is made such that, after assembly, the engagement claw 29 is positioned above the engagement protrusion 30 and/or the engagement portion 26 is positioned more laterally outward than the side frame 8, the engagement state can be checked easily.

The engagement protrusion 30 exhibits a triangular shape as seen in the radial direction, and includes a guide surface 30a that extends away from the main body 25 toward the engagement claw 29 and a retaining surface 30b that is provided at a position closer to the guide surface 30a than the engagement claw 29 is and approaches the main body 25 toward the engagement claw 29. The guide surface 30a guides the first extension portion 16a when the position holding member 24 is assembled to the torsion bar 14, and the retaining surface 30b cooperates with the engagement claw 29 and the right end surface of the main body 25 to hold the first extension portion 16a in the assembled state. The angle of the retaining surface 30b relative to the right end surface of the main body 25 is steeper than the angle of the guide surface 30a relative to the right end surface of the main body 25, and therefore, it requires a larger force when reverse-rotating the position holding member 24 to release the engagement between the position holding member 24 and the first extension portion 16a than when rotating the position holding member 24 to make them engage with each other. It is to be noted that, instead of the engagement claw 29 and the engagement protrusion 30, the engagement portion 26 may be constituted of a recess (not shown in the drawings) provided on the main body 25 or a combination of the engagement claw 29 and the recess.

Figure 6:
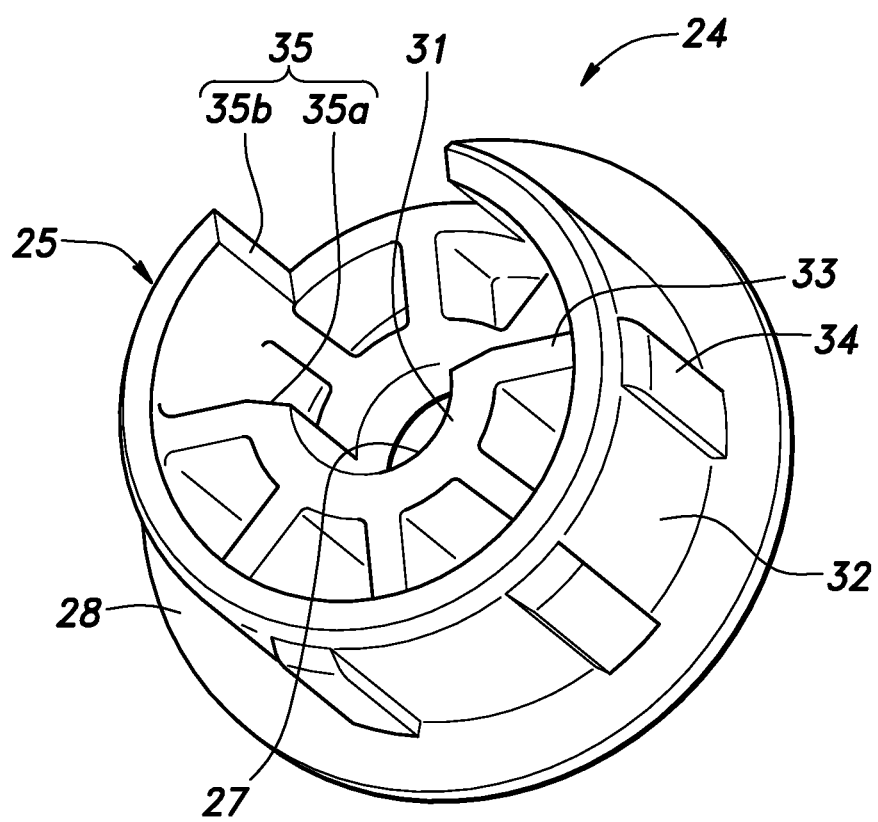
FIG. 6 is a perspective view the position holding member according to the first embodiment as viewed from another direction.

As shown in FIG. 6, the cylindrical main body 25 of the position holding member 24 is hollowed to have a two-layer structure, and includes an inner circumferential wall 31 defining the through-hole 27, an outer circumferential wall 32 slidably contacting an inner circumferential surface of the connection pipe 12 defining the inner hole 13 and rotatably supported by the connection pipe 12, and multiple reinforcement walls 33 extending in the radial direction to connect between the inner circumferential wall 31 and the outer circumferential wall 32. To reduce the frictional resistance when the position holding member 24 rotates relative to the connection pipe 12 about the axis, the outer circumferential surface of the outer circumferential wall 32 is provided with multiple ribs 34 along the axial direction so that the ribs 34 slidably contact the inner circumferential surface of the connection pipe 12. The multiple ribs 34 are arranged at a substantially regular interval in the circumferential direction over a prescribed area on the side that receives the transverse force from the torsion bar 14. The multiple reinforcement walls 33 are arranged at a substantially regular interval in the circumferential direction, and the reinforcement walls 33 positioned on the side where the ribs 34 are provided are aligned with the ribs 34 in the radial direction, and thereby, the reinforcement against the transverse force from the torsion bar 14 is achieved efficiently.

The inner circumferential wall 31 and the outer circumferential wall 32 of the position holding member 24 are respectively provided, in the left end surfaces thereof, with an inner receiving groove 35a and an outer receiving groove 35b which are recessed to extend in the radial direction. The inner receiving groove 35a and the outer receiving groove 35b are provided at positions on the circumferentially opposite side of the ribs 34 and mutually aligned with each other in the radial direction. The circumferential width of the inner receiving groove 35a and the outer receiving groove 35b is substantially the same as the diameter of the torsion bar 14. The depth of the inner receiving groove 35a and the outer receiving groove 35b in the lateral direction is set such that a receiving groove 35 constituted of the inner receiving groove 35a and the outer receiving groove 35b can receive the extension portion 16 of the torsion bar 14 when the position holding member 24 is assembled to the torsion bar 14. The receiving groove 35 is provided at a position displaced from the engagement portion 26 in the circumferential direction by about 90 degrees. It is to be noted that the angle of the position of the receiving groove 35 relative to the engagement portion 26 may be changed within a range in which they are misaligned with each other in the circumferential direction. Further, because the strength is lowered around the receiving groove 35, the receiving groove 35 is provided at a position circumferentially displaced from the side where the transverse force that the position holding member 24 receives from the torsion bar becomes the maximum; for example, at a diagonal position.

Now, a description will be made of the assembly method and the advantages. The worker inserts the free end of the second extension portion 16b of the torsion bar 14 into the through-hole 27 from the left end side of the position holding member 24 and moves the position holding member 24 to the right end side of the shaft portion 15. At this time, since the position holding member 24 is provided with the receiving groove 35, the extension portion 16 that is bent relative to the shaft portion 15 can be passed.

Then, the worker rotates the position holding member 24 relative to the shaft portion 15 of the torsion bar 14 about the axis. At this time, the first extension portion 16a slides along the guide surface 30a of the engagement protrusion 30 while resiliently deforming the engagement claw 29, and thereafter, is disposed between the engagement claw 29 and the engagement protrusion 30. The engagement claw 29 cooperates with the engagement protrusion 30 to resiliently hold the first extension portion 16a.

Thereafter, the worker inserts the torsion bar 14 to which the position holding member 24 has been mounted into the inner hole 13 of the connection pipe 12 and make the fold-back portion 17 and the second extension portion 16b of the torsion bar 14 engage with the flattened pipe portion 20 and the right side frame 8, respectively.

Owing to the provision of the receiving groove 35, though the torsion bar 14 is bent it is possible to fit the position holding member 24 onto the torsion bar 14 from the end portion thereof and to move it to a prescribed position, and therefore, the assembly is easy and the position holding member 24 can consist of an integrally molded article such that the number of components is reduced.

Once the engagement portion 26 engages with the first extension portion 16a, the rotation of the position holding member 24 relative to the torsion bar 14 about the axis and the lateral movement of the position holding member 24 relative to the torsion bar 14 are restricted, and the position and the attitude of the position holding member 24 are stabilized. Therefore, even if the position holding member 24 assembled to the torsion bar 14 is shipped, the risk that the position holding member 24 may move out of place or suffer damage is small.

Due to the engagement of the engagement portion 26 with the first extension portion 16a, the position holding member 24 will rotate relative to the connection pipe 12 together with the right end side of the shaft portion 15 of the torsion bar 14. Therefore, the position on the position holding member 24 where the transverse force of the torsion bar 14 is applied is fixed, whereby it is sufficient that the position holding member 24 has a strength withstanding the transverse force in a narrow angular range. Thus, it is possible to reduce the size and weight of the position holding member 24 and to provide the receiving groove 35 in a part where the influence of the transverse force is small.

Figure 7:
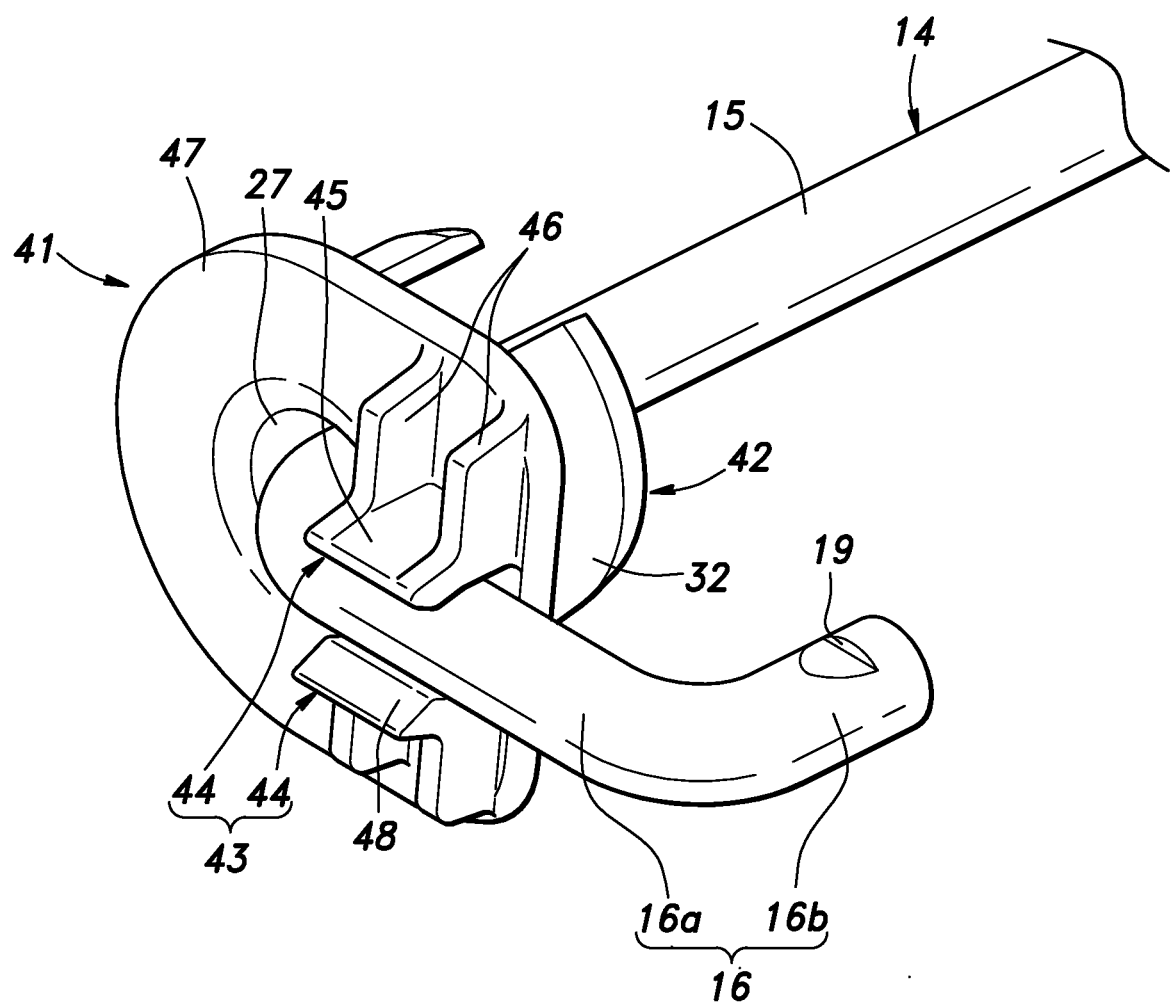
FIG. 7 is a perspective view showing an assembled state of a position holding member according to the second embodiment to the torsion bar.

Next, with reference to FIGS. 7 to 9, the second embodiment of the present invention will be described. In the following description, the parts common with the first embodiment will be denoted by the same reference numerals and the description thereof will be omitted. In the second embodiment, the shape and the assembling method of the position holding member 41 are different from those of the first embodiment.

The position holding member 41 according to the second embodiment is an integrally molded article including a main body 42 configured to hold the shaft portion 15 of the torsion bar 14 and to be attached to the connection pipe 12 and an engagement portion 43 configured to engage with the first extension portion 16a of the torsion bar 14.

As in the first embodiment, the main body 42 has a cylindrical shape provided with a through-hole 27 extending along the lateral direction and includes an inner circumferential wall 31, an outer circumferential wall 32, and reinforcement walls 33. It is to be noted that the main body 42 does not include a structure corresponding to the ribs 34 in the first embodiment.

Figure 8:
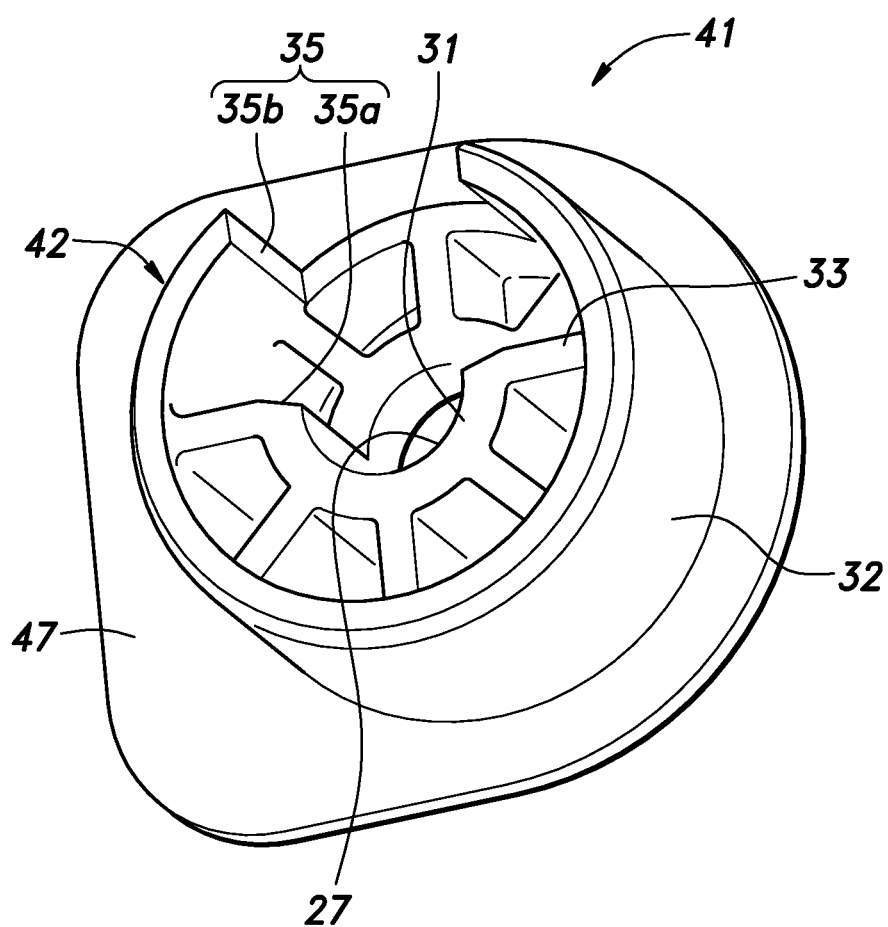
FIG. 8 is a perspective view showing the position holding member according to the second embodiment.
Figure 9:
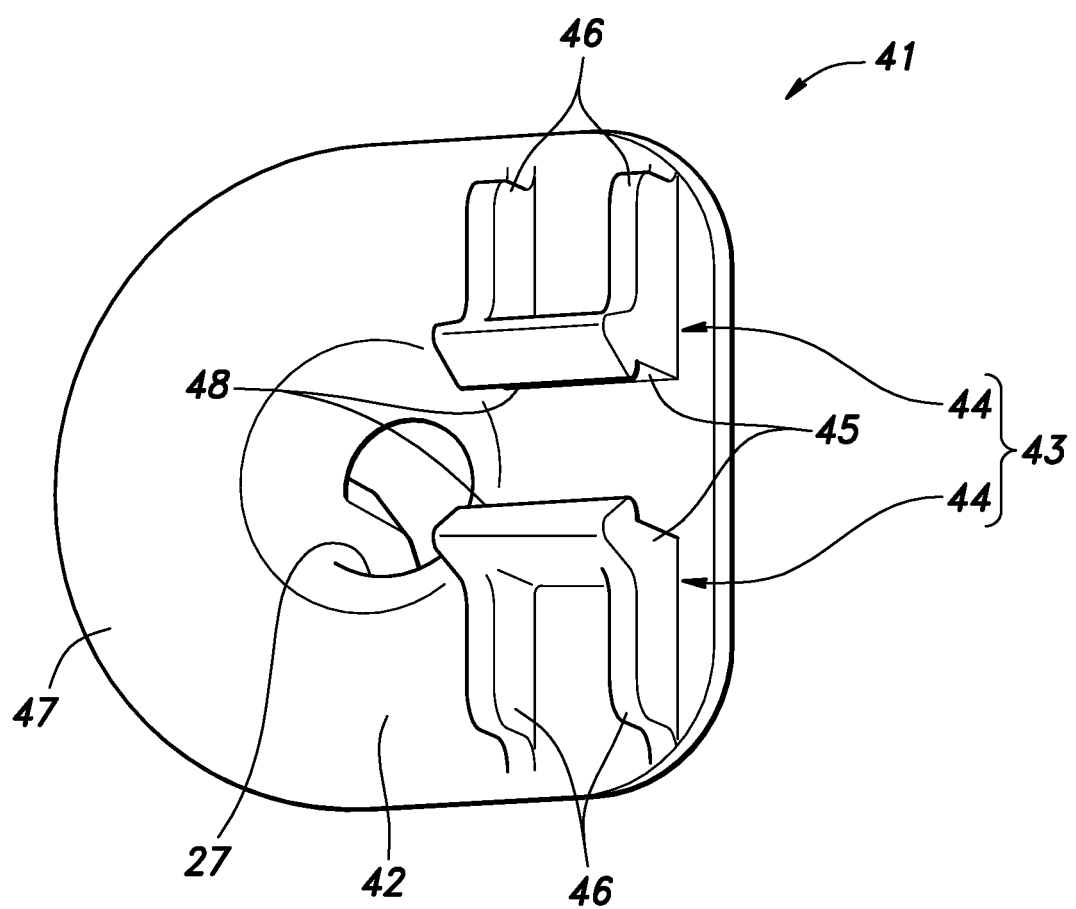
FIG. 9 is a perspective view showing the position holding member according to the second embodiment as viewed from another direction.

As shown in FIG. 8, the engagement portion 43 includes a pair of engagement claws 44, 44 that are provided on the right end surface of the main body 42 and oppose each other. The pair of engagement claws 44, 44 are mirror symmetric to each other. Each engagement claw 44 includes an engagement piece 45 configured to engage with the extension portion 16 of the torsion bar 14 and ribs 46 provided on the side of the engagement piece 45 opposite from the side facing the first extension portion 16a to extend along the respective lateral edges thereof for reinforcing the strength. A flange 47 that radially extends from the side circumferential surface of the right end of the main body 42 extends to a part where the ribs 46 are provided and supports the ribs 46.

The rightward protruding length of the engagement piece 45 is greater than the radius of the first extension portion 16a, and preferably is greater than or equal to the diameter of the first extension portion 16a. The side of the engagement piece 45 facing the first extension portion 16a is provided with a ridge 48 extending along the extension direction of the first extension portion 16a at a part protruding from the main body 25 beyond the radius of the first extension portion 16a. The distance between the pair of engagement pieces 45, 45 is substantially the same as the diameter of the first extension portion 16a. Also, the distance between the pair of ridges 48, 48 is smaller than the diameter of the first extension portion 16a so that the tip end of each ridge 48 press-contacts the first extension portion 16a. Thereby, the pair of engagement claws 44, 44 resiliently hold the first extension portion 16a.

Now, a description will be made of the assembly method and the advantages. The worker inserts the free end of the second extension portion 16b of the torsion bar 14 into the through-hole 27 from the left end side of the position holding member 41 and moves the position holding member 41 to the right end side of the shaft portion 15. At this time, the position holding member 41 is positioned more leftward than the target lateral position of the position holding member 41 by a degree equivalent to or greater than the rightward protruding length of the engagement claws 44. As in the first embodiment, the position holding member 41 is provided with the receiving groove 35, and therefore, the extension portion 16 that is bent relative to the shaft portion 15 can be passed.

Then, the worker rotates the position holding member 41 relative to the shaft portion 15 of the torsion bar 14 about the axis to align the gap between the pair of engagement claws 44, 44 with the first extension portion 16a of the torsion bar 14 in the lateral direction, and thereafter, moves the position holding member rightward. At this time, the pair of ridges 48 are pushed by the first extension portion 16a to move away from each other and the pair of engagement claws 44, 44 deform resiliently, whereby the first extension portion 16*a* can pass between the pair of engagement claws 44, 44. Once the central axis of the first extension portion 16*a* passes between the pair of ridges 48, 48, the pair of engagement claws 44, 44 partially recover from the resilient deformation, whereby the pair of engagement claws 44, 44 resiliently hold the first extension portion 16*a*.

Thereafter, as in the first embodiment, the worker inserts the torsion bar 14 to which the position holding member 41 has mounted into the inner hole 13 of the connection pipe 12 and make the fold-back portion 17 and the second extension portion 16*b* of the torsion bar 14 engage with the flattened pipe portion 20 and the right side frame 8, respectively.

Even though the position holding member 41 is an integrally molded article, owing to the provision of the receiving groove 35, the assembly to the bent torsion bar 14 is easy as in the first embodiment.

Once the engagement portion 43 engages with the first extension portion 16*a*, the position holding member 41 does not rotate relative to the torsion bar 14 about the axis owing to the retention by the pair of engagement pieces 45, 45, and also the movement in the lateral direction is restricted owing to the retention by the pair of ridges 48, 48 and right surface of the main body 42. Therefore, even if the position holding member 24 assembled to the torsion bar 14 is shipped, the risk that the position holding member 24 may move out of place or suffer damage is small.

As in the first embodiment, due to the engagement of the engagement portion 43 with the first extension portion 16*a*, the position holding member 41 will rotate relative to the connection pipe 12 together with the right end side of the shaft portion 15 of the torsion bar 14. Therefore, the position on the position holding member 41 where the transverse force of the torsion bar 14 is applied is fixed, whereby it is sufficient that the position holding member 41 has a strength withstanding the transverse force in a narrow angular range. Thus, it is possible to reduce the size and weight of the position holding member 41 and to provide the receiving groove 35 in a part that does not receive the transverse force.

The concrete embodiments have been described in the foregoing, but various modifications of the present invention are possible without being limited to the above embodiments. In the above embodiments, left and right may be reversed. The connection pipe may be formed as a part of the cushion frame and be pivotally supported by the pair of left and right rear links, with the extension portion of the torsion bar being engaged with one of the rear links. It is also possible to provide the connection pipe and the torsion bar coaxially with the pivot portions between the base members and the rear links, secure the connection pipe to one of the base members and the rear links, and make the extension portion of the torsion bar engage with the other of the base members and the rear links. The connection pipe may have any shape so long as the part receiving the position holding member has a circular inner circumferential surface, and the other part may have a rectangular pipe shape or a rod-like shape. The connection pipe and the torsion bar may be attached to the front links instead of the rear links. The prior art referred to in the present application is incorporated herein by reference in its entirety.

Glossary

1: vehicle seat
2: base member
3: seat cushion
5: cushion frame
6: link mechanism
7: drive mechanism
8: side frame (second portion)
11: rear link
12: connection pipe (first portion)
13: inner hole
14: torsion bar
15: shaft portion
16: extension portion
24, 41: position holding member
25, 42: main body
26: engagement portion
27: through-hole
29, 44: engagement claw
30: engagement protrusion
31: inner wall
32: outer circumferential wall
33: reinforcement wall
34: rib
35: receiving groove

The invention claimed is:

1. A vehicle seat provided with a height-adjustable seat cushion, comprising:
    a base member supported by a vehicle body;
    a cushion frame constituting a frame of the seat cushion;
    a link mechanism that supports the cushion frame to be movable up and down relative to the base member;
    a drive mechanism that drives the cushion frame in a vertical direction via the link mechanism; and
    a torsion bar that, to urge the cushion frame upward, extends between left and right side portions of the cushion frame and has lateral first and second ends respectively joined to a first portion and a second portion that rotate relative to each other in a pivot portion of the link mechanism,
    wherein the torsion bar includes a shaft portion extending in a lateral direction and an extension portion at least partially extending in a direction intersecting the shaft portion and joined to the second portion on a side of the second end,
    the first portion unrotatably supports the first end of the torsion bar and supports a part of the shaft portion of the torsion bar adjacent to the second end via a position holding member for suppressing displacement of the axis of the torsion bar, and
    the position holding member includes a main body supported to be rotatable relative to the first portion and provided with a through-hole for insertion of the shaft portion and an engagement portion engaging with the extension portion so as to rotate integrally.

2. The vehicle seat according to claim 1, wherein one of the cushion frame and the link mechanism includes a connection pipe that is rotatable relative to the other,
    the connection pipe constitutes the first portion, and
    the main body of the position holding member has a cylindrical contour and is rotatably received in an inner hole of the connection pipe.

3. The vehicle seat according to claim 1, wherein the engagement portion of the position holding member includes an engagement protrusion that protrudes from the main body and an engagement claw that protrudes from the main body and resiliently holds the extension portion in cooperation with the engagement protrusion.

4. The vehicle seat according to claim 3, wherein the engagement claw retains the extension portion by overhanging the same and is positioned above the engagement protrusion.

5. The vehicle seat according to claim 1, wherein the engagement portion of the position holding member includes a pair of engagement claws that protrude from the main body and resiliently hold the extension portion.

6. The vehicle seat according to claim 1, wherein the engagement portion is positioned more laterally outward than the second portion.

7. The vehicle seat according to claim 1, wherein the position holding member is provided, on a laterally inner end surface thereof, with a receiving groove recessed to extend in a radial direction so as to be capable of receiving the extension portion, and consists of an integrally molded article.

8. The vehicle seat according to claim 7, wherein the receiving groove is provided at a position circumferentially shifted from a side where a transverse force that the position holding member receives from the torsion bar becomes maximum.

9. The vehicle seat according to claim 8, wherein the side where the transverse force that the position holding member receives from the torsion bar becomes maximum is reinforced preferentially.

10. The vehicle seat according to claim 1, wherein multiple ribs extending along an axial direction are provided on an outer circumferential surface of the main body of the position holding member.

11. The vehicle seat according to claim 10, wherein a side circumferential wall of the main body includes an inner circumferential wall defining the through-hole, an outer circumferential wall rotatably supported by the first portion, and multiple reinforcement walls extending in a radial direction and connecting between the inner circumferential wall and the outer circumferential wall, and at least some of the reinforcement walls are provided at positions aligned with the ribs in the radial direction.

* * * * *